(12) United States Patent
Cheng et al.

(10) Patent No.: US 11,910,972 B2
(45) Date of Patent: Feb. 27, 2024

(54) SWEEPING ROBOT

(71) Applicants: GUANGDONG MIDEA WHITE HOME APPLIANCE TECHNOLOGY INNOVATION CENTER CO., LTD., Foshan (CN); MIDEA GROUP CO., LTD., Foshan (CN)

(72) Inventors: Jiefeng Cheng, Foshan (CN); Sungjin Kim, Foshan (CN); Qing Li, Foshan (CN); Site Hu, Foshan (CN); Zhonghua Li, Foshan (CN); Tao Fu, Foshan (CN)

(73) Assignees: GUANGDONG MIDEA WHITE HOME APPLIANCE TECHNOLOGY INNOVATION CENTER CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 383 days.

(21) Appl. No.: 17/285,095

(22) PCT Filed: Nov. 9, 2018

(86) PCT No.: PCT/CN2018/114876
§ 371 (c)(1),
(2) Date: Apr. 14, 2021

(87) PCT Pub. No.: WO2020/093383
PCT Pub. Date: May 14, 2020

(65) Prior Publication Data
US 2021/0386263 A1 Dec. 16, 2021

(51) Int. Cl.
*A47L 11/24* (2006.01)
*A47L 5/14* (2006.01)
(Continued)

(52) U.S. Cl.
CPC .............. *A47L 11/24* (2013.01); *A47L 5/14* (2013.01); *A47L 9/0477* (2013.01); *A47L 9/08* (2013.01);
(Continued)

(58) Field of Classification Search
CPC .... A47L 11/24; A47L 5/14–20; A47L 9/0477; A47L 9/08; A47L 9/2826; A47L 9/2852; A47L 9/0466; A47L 2201/00–06
See application file for complete search history.

(56) References Cited

U.S. PATENT DOCUMENTS

| | | |
|---|---|---|
| 2003/0192144 A1 | 10/2003 | Song et al. |
| 2008/0229539 A1 | 9/2008 | Hwang et al. |
| 2018/0255991 A1 | 9/2018 | Der Marderosian et al. |

FOREIGN PATENT DOCUMENTS

| | | |
|---|---|---|
| CN | 1386563 A | 12/2002 |
| CN | 1853549 A | 11/2006 |

(Continued)

OTHER PUBLICATIONS

English translation of DE102010019001A1 (Year: 2011).*
(Continued)

*Primary Examiner* — Laura C Guidotti
*Assistant Examiner* — Sukwoo James Chang (57) ABSTRACT

Provided is a sweeping robot. The sweeping robot includes a chassis and a jet dust raising structure, and the jet dust raising structure is installed on the chassis, the jet dust raising structure has an air inlet, an air outlet and a jet channel connected to the air inlet and the air outlet, the air inlet is configured for air flow into the jet channel, the air outlet is located on a front side of the brush suction port of the sweeping robot.

17 Claims, 7 Drawing Sheets

(51) Int. Cl.
    *A47L 9/04* (2006.01)
    *A47L 9/08* (2006.01)
    *A47L 9/28* (2006.01)
(52) U.S. Cl.
    CPC ......... *A47L 9/2826* (2013.01); *A47L 9/2852* (2013.01); *A47L 2201/04* (2013.01); *A47L 2201/06* (2013.01)

(56) References Cited

FOREIGN PATENT DOCUMENTS

| | | | | |
|---|---|---|---|---|
| CN | 101268922 A | 9/2008 | | |
| CN | 103741630 A | 4/2014 | | |
| CN | 104224045 A | 12/2014 | | |
| CN | 205268053 U | 6/2016 | | |
| CN | 105737330 A | 7/2016 | | |
| CN | 106108778 A | 11/2016 | | |
| CN | 106253063 A | 12/2016 | | |
| CN | 106871330 A | 6/2017 | | |
| CN | 107029527 A | 8/2017 | | |
| CN | 206434275 U | 8/2017 | | |
| CN | 107238132 A | 10/2017 | | |
| CN | 107440619 A | 12/2017 | | |
| CN | 107636548 A | * | 1/2018 | .......... A47L 11/4011 |
| CN | 207084770 U | 3/2018 | | |
| CN | 207855626 U | 9/2018 | | |
| DE | 102008020314 A1 | 10/2009 | | |
| DE | 102010019001 A1 | * | 11/2011 | ....... F02M 35/10144 |
| ES | 2669595 T3 | * | 5/2018 | .......... A47L 9/1409 |
| JP | H10173 A | 1/1998 | | |
| JP | H11123165 A | 5/1999 | | |
| JP | H11187988 A | 7/1999 | | |
| JP | 2001258807 A | 9/2001 | | |
| JP | 2003310489 A | 11/2003 | | |
| JP | 2007117254 A | 5/2007 | | |
| JP | 2016131888 A | 7/2016 | | |
| KR | 20000058687 A | 10/2000 | | |
| KR | 20060111788 A | 10/2006 | | |
| KR | 20070005430 A | 1/2007 | | |
| KR | 20170022067 A | * | 3/2017 | ............... A47L 7/04 |
| WO | WO2008/099999 A1 | * | 8/2008 | ............... A47L 9/28 |

OTHER PUBLICATIONS

English translation of KR20170022067A (Year: 2017).*
English translation of CN107636548A (Year: 2018).*
English translation of ES2669595T3 (Year: 2018).*
Korean Request for the Submission of an Opinion, Korean Application No. 20217009315, mailed Aug. 11, 2022(12 pages).
Japanese Notice of Reasons for Refusal, Japanese Application No. 2021519552, dated May 31, 2022(8 pages).
European search report, European Application No. 18939135.2, dated Aug. 23, 2021(6 pages).
International search report, International Application No. PCT/CN2018/114876, dated Nov. 12, 2019(12 pages).
First Office Action in Chinese Application No. 201711382954.3, dated Sep. 4, 2019.
Second Office Action in Chinese Application No. 201711382954.3, dated Feb. 26, 2020.
Notification to Grant Patent Right for Invention in Chinese Application No. 201711382954.3, dated May 19, 2020.
Notice of Reasons for Refusal in JP Application No. 2021-519552, dated Nov. 15, 2022.
Second Office Action in Chinese Application No. 201880039285.6, dated Oct. 13, 2022.
Reconsideration Report by Examiner before Appeal in JP Application No. 2021-519552, dated May 31, 2023.

* cited by examiner

FIG. 13

SWEEPING ROBOT

CROSS-REFERENCES TO RELATED APPLICATIONS

The present disclosure is a national phase application of International Application No. PCT/CN2018/114876 filed Nov. 9, 2018, the entireties of which are herein incorporated by reference.

FIELD

The present disclosure relates to the field of a sweeping robot technology, and in particular, to a sweeping robot.

BACKGROUND

With improvement of living standards, sweeping robots have entered our lives, and requirements of the sweeping robots are higher and higher. For example, the sweeping robots instead of people for daily cleaning, dust removal abilities of the sweeping robots are a key performance. In the prior art, the sweeping robots cannot clean dust in ground gaps effectively. The sweeping robots cannot meet needs of people.

SUMMARY

A main purpose of the present disclosure is to provide a sweeping robot, aiming at improving a cleaning ability of the sweeping robot.

In order to achieve the above purpose, a sweeping robot is provided by the present disclosure. The sweeping robot includes a chassis and a jet dust raising structure installed on the chassis. The jet dust raising structure has a jet channel. The jet channel has an air inlet and an air outlet. The air inlet is configured for air flow to enter the jet channel. The air outlet is arranged in a front side of a brush suction port of the sweeping robot.

In one embodiment, the air outlet is arranged towards the brush suction port.

In one embodiment, the jet channel extends obliquely in a direction from a top of a front side of the chassis to the brush suction port.

In one embodiment, an angle α between the jet channel and a vertical direction ranges from 20° to 70°.

In one embodiment, the jet channel extends along a straight line, and an inner wall of the jet channel includes a flat surface.

In one embodiment, the jet channel includes a drainage section close to the air inlet and a jet section close to the air outlet. The drainage section extends along a straight line, and the jet section extends along the curve line.

In one embodiment, cross-sectional area of the jet channel is gradually reduced from the air inlet to the air outlet.

In one embodiment, a ratio S1/S2 of area S1 of the air outlet to area S2 of the air inlet is greater than or equal to 0.2 and less than 1.

In one embodiment, a length L of the air outlet ranges from 3 mm to 20 mm, or a width D of the air outlet ranges from 0.5 mm to 3 mm.

In one embodiment, a distance K between the air outlet and the brush suction port of the is greater than 0 and less than or equal to 20 mm.

In one embodiment, the chassis defines an air inlet chamber. The air inlet chamber has an air intake for the air flow. A plurality of the air inlets are connected to the air inlet chamber.

In one embodiment, the sweeping robot further includes a dust suction motor. An exhaust port of the dust suction motor is connected with at least one of the air inlet and an air intake of the air inlet chamber of the chassis.

In one embodiment, the exhaust port is connected to at least one of the air inlet and the air intake through a hose. The sweeping robot includes an mounting cylinder with a roller brush. A slot is defined on one side of the mounting cylinder away from the roller brush, and part of the hose is clamped in the slot.

In one embodiment, the exhaust port is connected to at least one of the air inlet and the air intake through a hose. The sweeping robot includes a mounting cylinder with a roller brush. A mounting column is arranged on one side of the mounting cylinder away from the roller brush. A circuit board of the sweeping robot is installed on the mounting column. The hose passes through a limiting gap formed by the circuit board, the mounting column and the mounting cylinder.

In one embodiment, the exhaust port is connected to at least one of the air inlet and the air intake through a pipeline, and a flow regulating valve is arranged on the pipeline.

In one embodiment, the sweeping robot includes a main control circuit and a detection device for dirt. The detection device detects the amount of dirt at a current position and sends a detection result to the main control circuit. The main control circuit obtains preset duration corresponding to the detection result according to the detection result, and controls the sweeping robot to stay at the current position for the preset duration.

In one embodiment, a bottom of the chassis is further provided with a pressurization bulge. The pressurization bulge is arranged in a front side of the brush suction port. The pressurization bulges are spaced along a length direction of the brush suction port. The air outlet is corresponding to a gap between two adjacent pressurization bulges.

In one embodiment, the air outlet is arranged at a front side of the pressurization bulge.

In one embodiment, a height of the pressurization bulge gradually increases from a front side of the chassis to the brush suction port. A maximum distance between the pressurization bulge and a bottom of the chassis ranges from 0.5 mm to 5 mm.

In one embodiment, the jet dust raising structure includes a jet sheet. The jet sheet is provided with the jet channels arranged along a length direction of the brush suction port.

In one embodiment, the jet dust raising structure further includes a baffle. The jet sheet and the baffle are enclosed to form an air inlet chamber. The air inlet is arranged in the air inlet chamber.

In one embodiment, the jet sheet is integrally formed with the chassis.

In the embodiments of the present disclosure, the jet dust raising structure is arranged on the chassis, and the jet channel of the jet dust raising structure runs through the top and the bottom of the chassis. The air flow enters the jet channel from the air inlet, and then is ejected at the air outlet after passing through the jet channel to raise the dust in front of the brush suction port, and raised dust is inhaled by the brush suction port. In response to the air flow being ejected, the air flow cannot only raise dust in flat, but also raise dust in gaps. In this way, dust that cannot be directly absorbed by the brush suction port can be raised, so that the brush suction port can absorb the dust in the narrow space such as the gap and hereafter improving efficiency of the brush suction port and the cleaning ability of the sweeping robot.

BRIEF DESCRIPTION OF THE DRAWINGS

Embodiments of the present disclosure are described by the drawings used for the description of the embodiments will be briefly described. Apparently, the drawings described below are only for illustration, but not for limitation.

The labels in the drawings are described as follows:

TABLE 1

| Reference numerals | Name | Reference numerals | Name |
|---|---|---|---|
| 100 | chassis | 110 | brush suction port |
| 120 | pressurization bulge | 200 | jet dust raising structure |
| 210 | jet channel | 220 | air inlet |
| 230 | air outlet | 240 | baffle |
| 250 | air inlet chamber | 260 | air intake |
| 270 | hose | 700 | dust cup |
| 760 | mounting column | 800 | mounting cylinder |
| 900 | dust suction motor | | |

Embodiments of the present disclosure will be further explained with reference to attached drawings in combination with the embodiments.

DETAILED DESCRIPTION OF THE DISCLOSURE

The disclosure will now be described in detail with reference to the accompanying drawings and examples. Apparently, the described embodiments are only a part of the embodiments of the present disclosure, not all of the embodiments.

It should be noted that if the embodiments of the present disclosure involve directional indication (such as up, down, left, right, front, rear, etc.), the directional indications are only used to explain the relative position relationship and motion between the elements in a posture (as shown in the figure). If the specific posture changes, the directional indications will change accordingly.

In addition, if there are descriptions of "first", "second" and the like in the embodiments of the present disclosure, the descriptions of "first", "second" and the like are only used herein for purposes of description and are not intended to indicate or imply relative importance or implicitly indicating the number of indicated features. Thus, the features defined as "first" and "second" are intended to indicate or imply including one or more than one these features. At the same time, the meaning of "and/or" in the description includes three schemes. Taking "A and/or B" as an example, "A and/or B" includes scheme A, or scheme B, or scheme A and B.

A sweeping robot is provided by the present disclosure. The sweeping robot includes a jet dust raising structure 200. Thus, the sweeping robot can clean dust in narrow space such as a ground gap. It is conducive to improving a cleaning ability of the sweeping robot.

A specific structure of the sweeping robot will be mainly describe as following.

Referring to FIG. 1 to FIG. 10, in some embodiments of the present disclosure, the sweeping robot includes a chassis 100 and a jet dust raising structure 200. The jet dust raising structure 200 is installed on the chassis 100. The jet dust raising structure 200 has an air inlet 220, an air outlet 230, and a jet channel 210 connected to the air inlet 220 and the air outlet 230. The air inlet 220 is configured for air flow to enter the jet channel 210. The air outlet 230 is arranged in a front side of a brush suction port 110 of the sweeping robot. The brush suction port 110 is arranged at a bottom of the chassis 100, and a roller brush 810 is arranged in the brush suction port 110.

In the embodiment, forms of the jet dust raising structure 200 are various, such as a plate-shaped form, a block-shaped form, a strip-shaped form and so on. There is no special limitation here, as long as the jet dust raising structure 200 has the jet channel 210 that can jet to achieve an effect of dust raising. There are many ways to install the jet dust raising structure 200 on the chassis 100, such as snap connection, screw fastening connection, adhesive connection and plug connection. In some embodiments, a slot may be defined by the chassis 100 to clamp the jet dust raising structure 200 into the slot. In the embodiment, taking the jet dust raising structure 200 and the chassis 100 as an integrated structure as an example. Shapes of the chassis 100 are various, such as polygon, ellipse, circle, etc. In the case of a same volume, the chassis 100 can be set as a circle to make the sweeping robot enter a narrower space.

Relationships between the jet dust raising structure 200 and the chassis 100 are various. For example, an installation port is opened on the chassis 100 to install a water jet dust raising structure into the installation port, or the jet dust raising structure 200 can be directly installed on the chassis 100 and a through hole connected to the jet channel 210 is formed on the chassis 100 to let the air flow through. As long as the air outlet 230 of the jet channel 210 can deliver the air flow to ground in front of the brush suction port 110.

A specific example of the jet dust raising structure 200 is introduced below. The jet dust raising structure 200 includes a jet sheet 280. The jet sheet 280 is provided with jet channels 210. The jet channels 210 are arranged along a length direction of the brush suction port 110. In the embodiment, the jet dust raising structure 200 is the jet sheet, and the jet channel 210 runs through two opposite plates of the jet sheet. The chassis 100 is provided with a mounting port, and the jet sheet is installed in the mounting port to make the air inlet 220 of the jet channel 210 connected with a top of the chassis 100, and the air outlet 230 connected with a bottom of the chassis 100. The jet channels 210 may make effectively raise the dust in front of the brush suction port 110. It is conducive to improve the cleaning effect of the sweeping robot. The air inlet 220 can supply air individually or collectively. In response to supplying air collectively, an air inlet chamber 250 is needed. Under these circumstances, the jet structure may also include a baffle 240, the jet sheet and the baffle 240 are enclosed to form an air inlet chamber 250, and the air inlet 220 is arranged in the air inlet chamber 250. The baffle 240 is in a strip shape, and a cross section of the baffle 240 can be in an L-shape or in a notch shape. In response to the baffle being in the L-shape, a plat is needed to arranged on the chassis 100 to cooperate with the baffle 240, and a structure formed by the baffle 240 and the plate covers on the jet sheet. In response to the baffle being in a notch shape, the baffle 240 covers on the jet sheet to form the air inlet chamber 250. In some embodiments, the baffle 240 can be integrated with the chassis 100 or with the jet sheet. In some embodiments, in order to simplify manufacturing and installation process of the jet sheet, the jet sheet is integrated formed with the chassis 100.

In the embodiment, the jet dust raising structure 200 is arranged on the chassis 100, and the jet channel 210 of the jet dust raising structure 200 runs through the top and the bottom of the chassis 100. The air flow enters the jet channel 210 from the air inlet 220, and then is ejected at the air outlet 230 after passing through the jet channel 210 to raise the dust in front of the brush suction port 110, and raised dust is inhaled by the brush suction port 110. In response to the air flow being ejected, the air flow cannot only raise dust in flat, but also raise dust in gaps. In this way, dust that cannot be directly absorbed by the brush suction port 110 can be raised, so that the brush suction port 110 can absorb the dust in the narrow space such as the gap and hereafter improving efficiency of the brush suction port 110 and the cleaning ability of the sweeping robot.

In some embodiments, in order to make the jet channel 210 achieve a better raising dust effect, the air outlet 230 is arranged towards the brush suction port 110. By arranging the air outlet 230 toward the brush suction port 110, the air flow from the jet channel 210 blows the dust to the brush suction port 110. Thus, it is convenient for the brush suction port 110 to absorb the dust. The jet channel 210 extends obliquely in a direction from a top of a front side of the chassis 100 to the brush suction port 110. That is, the jet channel 210 extends backward, and the jet channel 210 ejects the air flow backward. By setting the air inlet 220 on the top of the chassis 100, inlet air of the jet channel 210 does not affect jet of the air port 230, and at the same time, a extension direction of the jet channel 210 can be guaranteed to be from top to bottom, which is conducive to passing through the air flow.

In order to further ensure a jet effect, an angle α between the jet channel 210 and a vertical direction ranges from 20° to 70°. The angle between jet channel 210 and the vertical direction is a deflection angle of jet channel 210 towards the brush suction port 110. In response to the angle α being too small, air flow emitted reflects to the front side of the brush suction port 110, which is not conducive for the air flow to directly enter the brush suction port 110. In response to the angle α being too large, reflection distance is far away, the air flow may fall on a back side of the brush suction port 110, which is not conductive for the air flow to directly be absorbed into the brush suction port 110.

An inner wall of the jet channel 210 can be flat surface or curved surface. In some embodiments, the inner wall of the jet channel 210 may include the flat surface and the curved surface. The following introduction takes the flat as an example first, and then takes the inner wall of the jet channel 210 may including the flat surface and the curved surface as an example.

The jet channel 210 extends along a straight line, and the inner wall of the jet channel 210 includes the flat surface. In the embodiment, the jet channel 210 is a straight channel, and resistance of the air flow in the jet channel 210 is small and the air flow can be ejected from the air outlet 230 easily and quickly. At the same time, a straight jet channel 210 is easy to manufacture, which is easy to simplify manufacturing process. Under some special conditions, the jet channel 210 needs to be provided with a large angle change. Under these circumstances, the curved surface is need to guide the air flow to make the air flow smoothly transit in process of deflecting.

Figure 1:
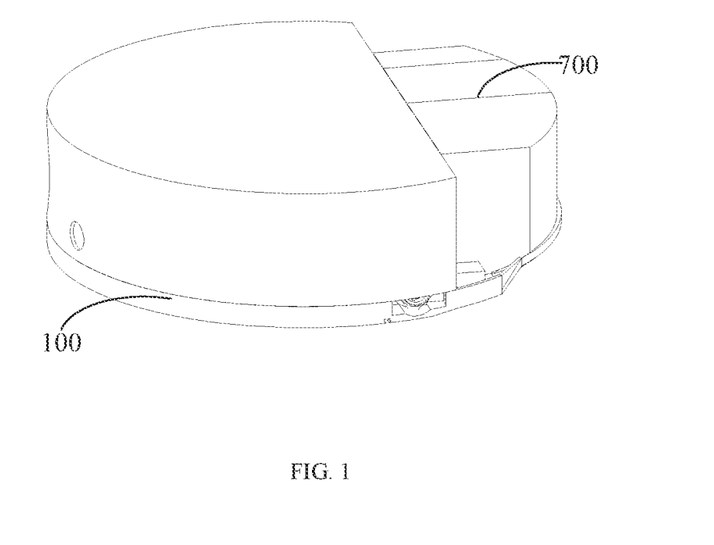
FIG. 1 is a structural schematic view of an embodiment of the sweeping robot of the present disclosure.
Figure 2:
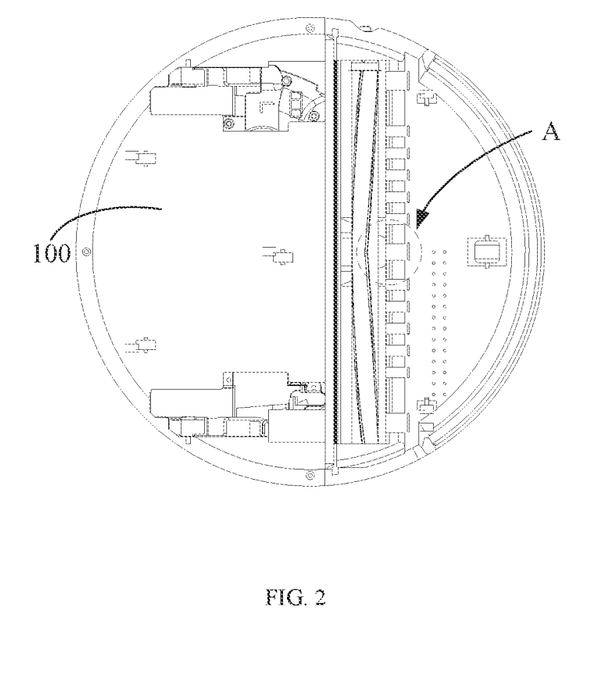
FIG. 2 is a structural schematic view of a bottom of FIG. 1.
Figure 3:
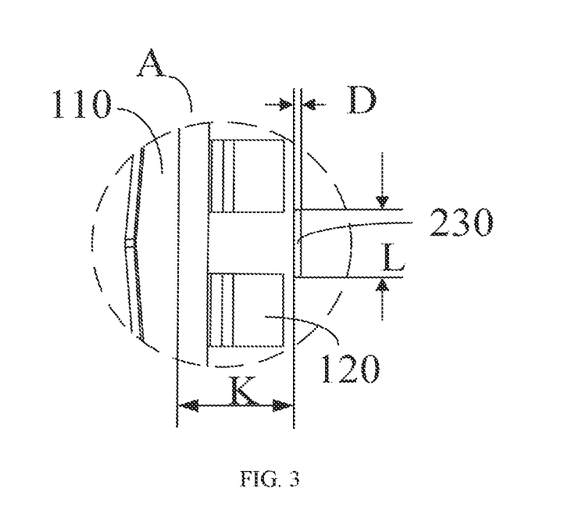
FIG. 3 is a partial enlarged view at A in FIG. 2.
Figure 4:
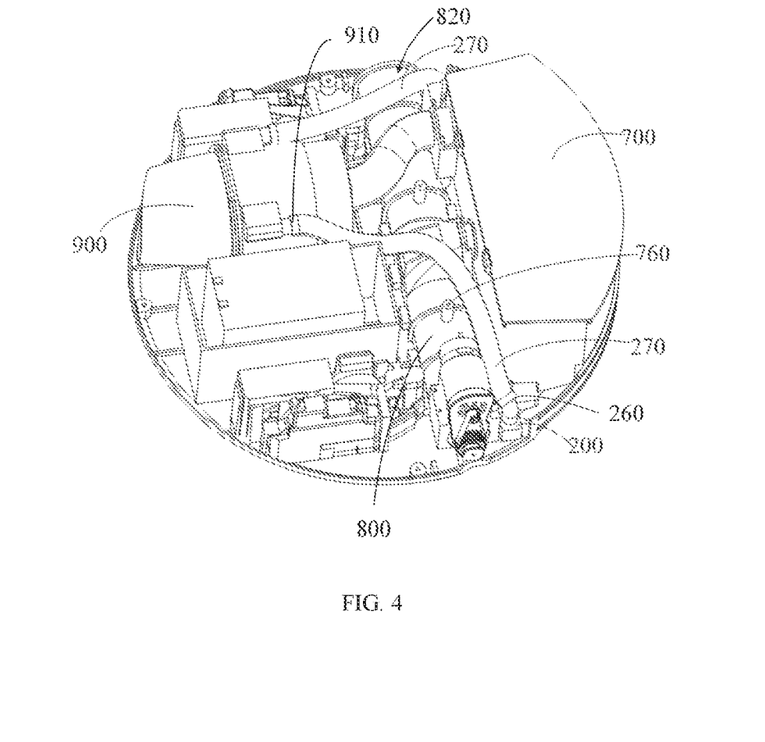
FIG. 4 is a structural schematic view of a top of a chassis provided by an embodiment.
Figure 5:
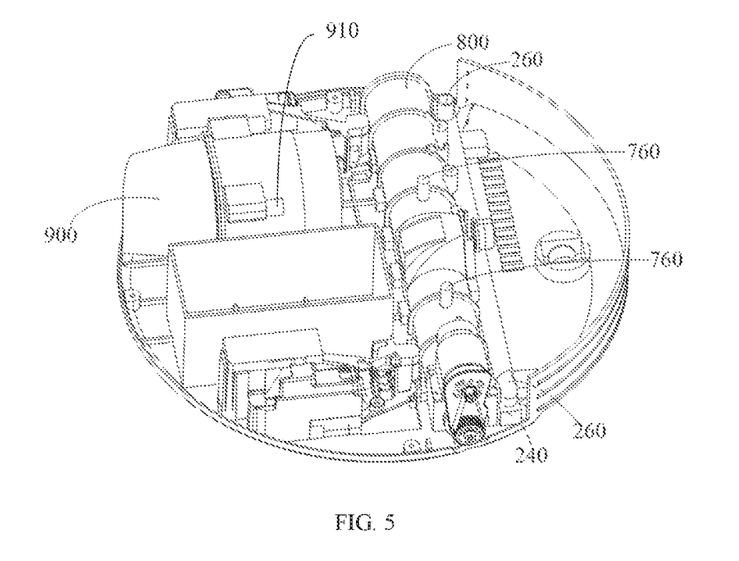
FIG. 5 is a structural schematic view of the top of the chassis provided by another embodiment.
Figure 6:
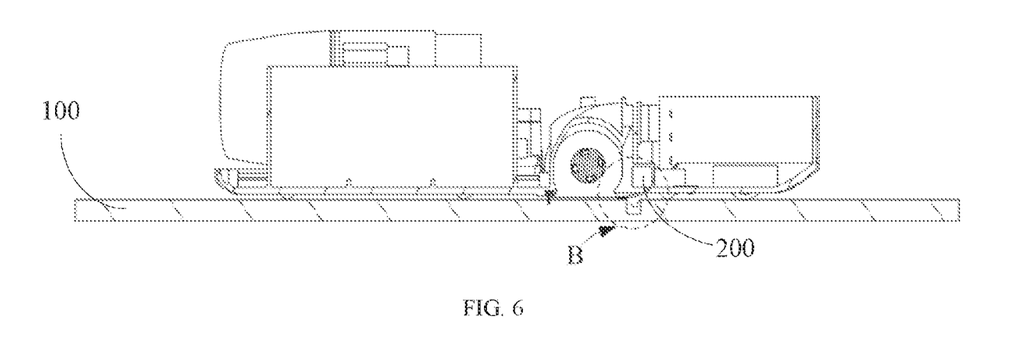
FIG. 6 is a schematic diagram of an internal structure of the sweeping robot provided by an embodiment of the present disclosure.
Figure 7:
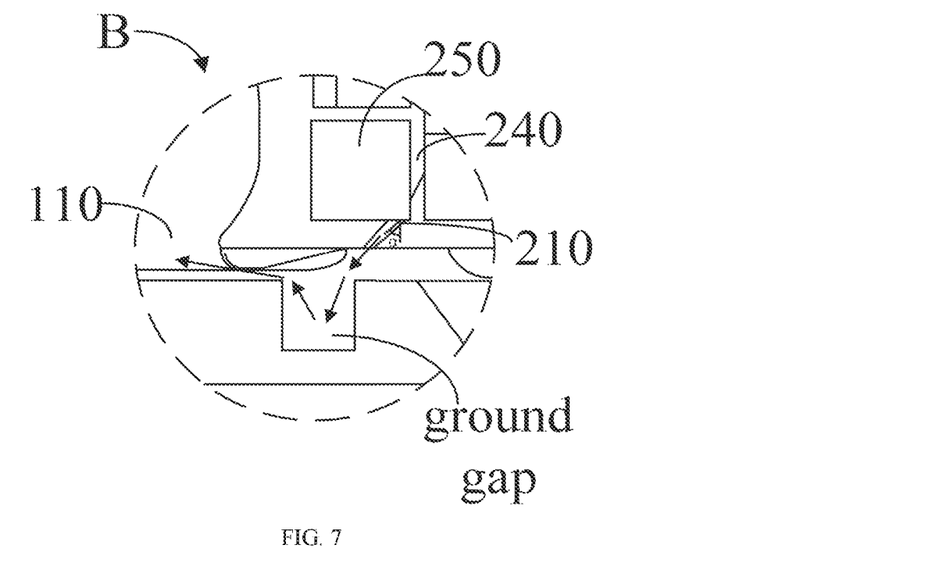
FIG. 7 is a partial enlarged view at B in FIG. 6.
Figure 8:
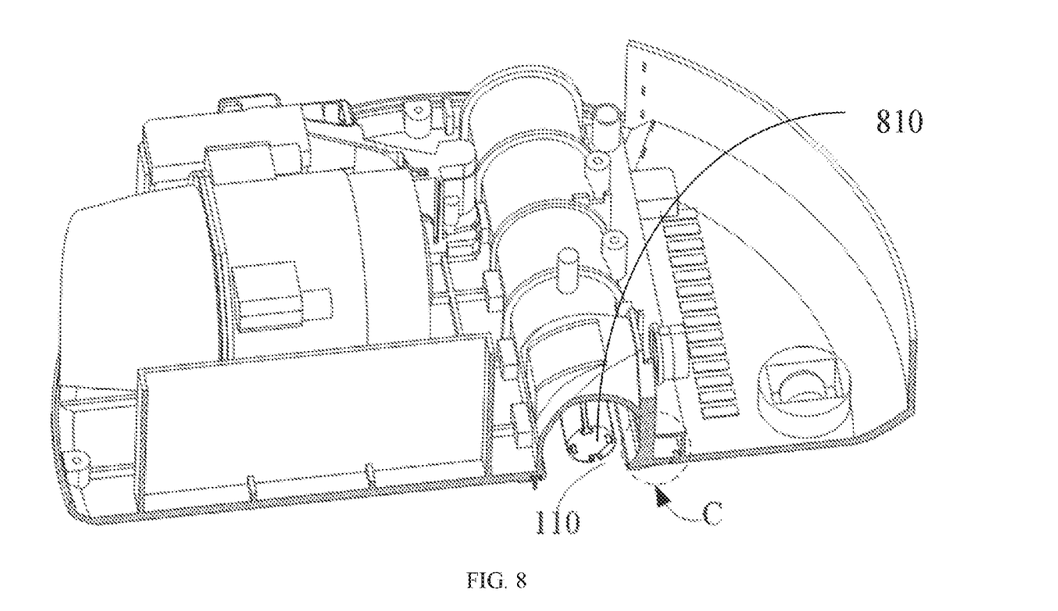
FIG. 8 is a sectional structure diagram of an embodiment of the sweeping robot of the present disclosure.
Figure 9:
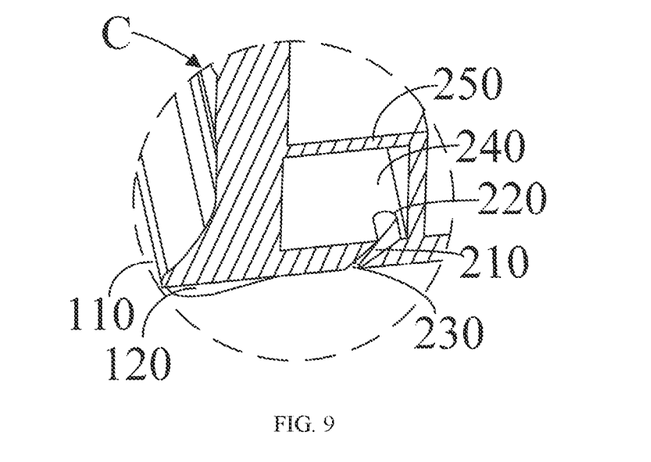
FIG. 9 is a partial enlarged view at C in FIG. 8.
Figure 10:
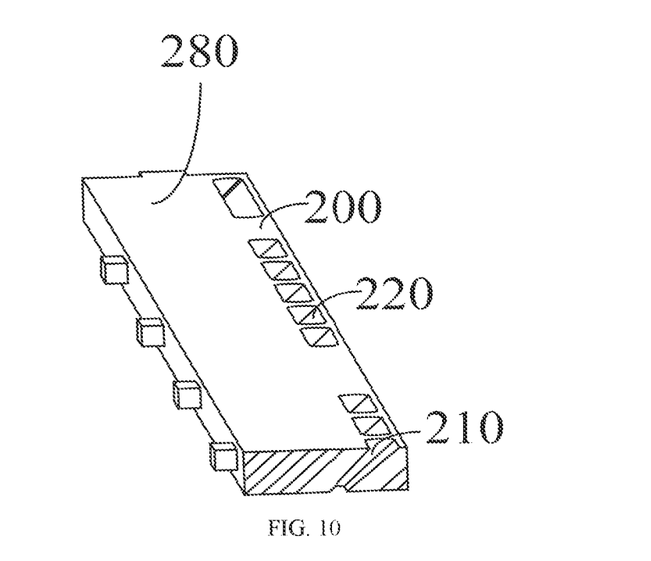
FIG. 10 is a structural schematic view of jet sheets of the sweeping robot provided by an embodiment of the present disclosure.
Figure 11:
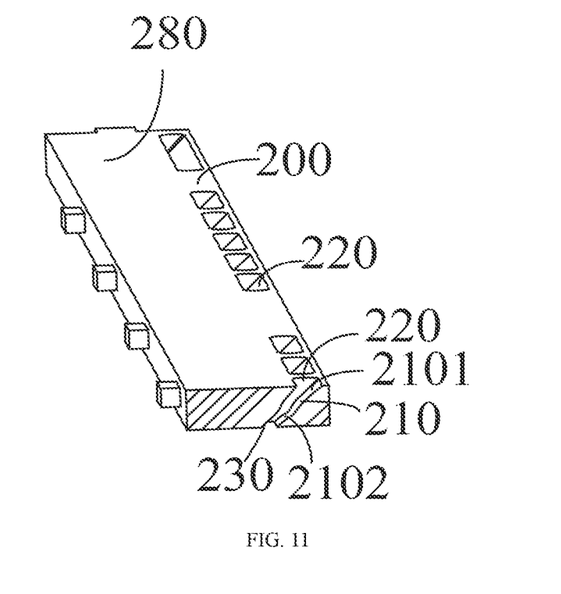
FIG. 11 is a structural schematic view of jet sheets of the sweeping robot provided by another embodiment of the present disclosure.

In some embodiments, referring to FIG. 11 together, in order to make the jet channel 210 have a large steering angle in an effective space, a curved section is arranged close to the air outlet 230, and the jet channel 210 includes a drainage section 2101 close to the air inlet 220 and a jet section 2102 close to the air outlet 230. The drainage section 2101 extends along a straight line and the jet section 2102 extends along a curve line. In the embodiment, the air flow first passes through a straight drainage section 2101. Before the air flow is ejected from the air port 230, a jet direction of the air flow needs to be adjusted. The jet section 2102 can make a jet angle of the air flow achieve a best effect of jet.

In order to further improve a raising dust effect, cross-sectional area of the jet channel 210 is gradually reduced from the air inlet 220 to the air outlet 230. By reducing the cross-sectional area of the jet channel 210, air pressure of air flow in the jet channel 210 increases gradually, flow rate of air flow at air outlet 230 can be higher, which is conducive to greatly improving the raising dust effect. In order to further improve adjustment accuracy of pressure and flow rate in the jet channel 210, a ratio S1/S2 of area S1 of the air outlet 230 to area S2 of the air inlet 220 is greater than or equal to 0.2 and less than 1. In a range, the ratio of the area of the air outlet 230 to the area of the air inlet 220 is inversely related to increase of the pressure and the flow rate. However, the ratio of the area of air outlet 230 to the area of air inlet 220 cannot be too large. In response to the ratio being equal to 1, an effect of increasing the pressure and the flow rate will not be achieved. In response to the ratio being less than 0.2, area difference between air outlet 230 and air inlet 220 is large. Normal flow of air flow will be affected, witch is not conducive to jet of the air flow.

In order to achieve a better jet effect, a length L of the air outlet 230 ranges from 3 mm to 20 mm, and/or a width D of the air outlet 230 ranges from 0.5 mm to 3 mm. The length of air outlet 230 cannot be too long or too short. In response to the length of air outlet 230 being too long, the air flow flowing out along a length direction of air outlet 230 is uneven, and turbulence is easy to occur along the length direction, which is not conducive to accurate jet of the air flow. In response to the length of air outlet 230 being too short, a jet length is not enough, and an effect is not good. Similarly, the width of air outlet 230 cannot be too large or too small. In response to the width of air outlet 230 being too large, the air flow flowing out along a width direction of air outlet 230 is uneven, and turbulence is easy to occur along the width direction, which is not conducive to accurate jet of the air flow. In response to the width of air outlet 230 being too short, a jet width is not enough and the effect is not good.

In order to further improve the raising dust effect from the jet channel 210, a distance K between the air outlet 230 and the brush suction port 110 is greater than 0 and less than or equal to 20 mm. The distance between the air outlet 230 and the brush suction port 110 is very important. After the air flow is emitted into the ground (gap), the air flow is reflected to the brush suction port 110. In response to the distance between the air outlet 230 and the brush suction port 110 being too long, it is difficult for the air flow to be emitted to the brush suction port 110 accurately and quickly, and the raising dust effect is not good.

In some embodiments, the chassis 100 defines an air inlet chamber 250 to improve air inlet efficiency. The air inlet chamber 250 may have an air intake 260 for the air flow in, and the air inlet 220 is connected with the air inlet chamber 250. In response to the number of air inlets 220 is multiple, air inlets 220 are all connected with the air inlet chamber 250, so that air inlets 220 can supply air simultaneously. In addition, a position of the air inlet 220 is more flexible by setting the air inlet chamber 250. It is convenient for the air inlet 220 to be connected to the brush suction port 110. The air inlet chamber 250 extends along the length direction of the brush suction port 110 so that the air inlet 220 and the air outlet 230 can be connected to the brush suction port 110, and at the same time, the length of the jet channel 210 can be reduced and hereafter reducing distance of air flow movement.

In order to simplify a whole machine structure and make use of an existing structure to supply air as reasonably as possible, the sweeping robot also includes a dust suction motor 900, and an exhaust port 910 of the dust suction motor 900 is connected with at least one of the air inlet 220 and the air intake 260 of the air inlet chamber 250 of the chassis 100. The dust suction motor 900 is connected with a dust cup 700 and the brush suction port 110 to form negative pressure at the brush suction port 110, thus absorbing dust. In the embodiment, the air flow in the dust cup 700 is also transmitted to the jet channel 210, forming a circulation of the air flow. A circulation path is as follows: the brush suction port 110 absorbs air flow under the negative pressure, the air flow flows from the brush suction port 110 to the dust cup 700, and then enters the jet channel 210 through the dust suction motor 900, and the air flow from the jet channel 210 is absorbed by the brush suction port 110. In this way, reuse of the dust suction motor 900 makes utilization of the dust suction motor 900 greatly improved.

Ways of the exhaust port 910 of the dust suction motor 900 is connected with at least one of the air inlet 220 and the air intake 260 of the air inlet chamber 250 of the chassis 100 are various, such as connection through pipe, direct connection between them, or connection through a hose 270. In one embodiment, the exhaust port 910 is connected with at least one of the air inlet 220 and the air intake 260 through the hose 270. The sweeping robot includes a mounting cylinder 800 with a roller brush 810. A slot 820 is defined on one side of the mounting cylinder 800 away from the roller brush 810, and part of the hose 270 is clamped in the slot 820. In the embodiment, the exhaust port 910 of dust suction motor 900 and the air inlet 220 of the jet channel 210 are connected through the hose 270. Because rigidity of the hose 270 is low, the hose 270 may shake during working. The hose 270 is fixed in the slot 820 to avoid shaking of the hose 270 and improve stability of the hose 270.

Figure 12:
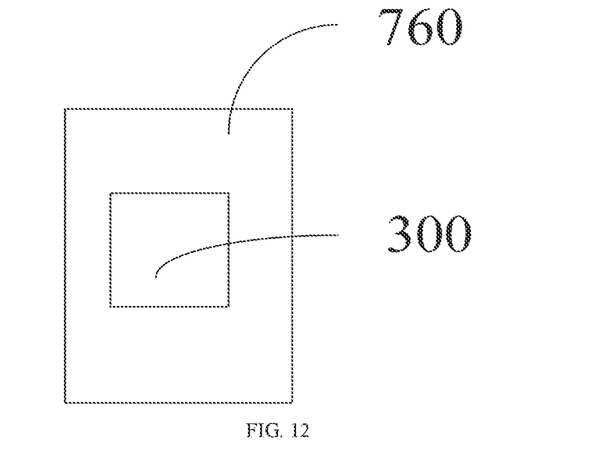
FIG. 12 is a structural schematic view of a circuit board and a mounting column provided by an embodiment of the present disclosure.

In some embodiments, referring to FIG. 12 together, the exhaust port 910 is connected with at least one of the air inlet 220 and the air intake 260 through the hose 270. The sweeping robot includes the mounting cylinder 800 with the roller brush 810, and a mounting column 760 is arranged on one side of the mounting cylinder 800 away from the roller brush 810, and a circuit board 300 of the sweeping robot is installed on the mounting column 760. The hose 270 passes through a limiting gap formed by the circuit board 300, the mounting column 760 and the mounting cylinder 800. The number of mounting columns 760 is two. Two mounting columns 760 support both ends of the circuit board 300 respectively. Top of the two mounting columns 760 and the mounting cylinder 800 and the circuit board 300 are enclosed to form the limiting gap. The hose 270 is not easy to shake after passing through the limiting gap, thus improving the stability of the hose 270.

In some embodiments, in order to control jet intensity and jet duration in a same position according to dirt level of current ground, two feasible schemes are given below.

The first one is that the exhaust port 910 is connected with at least one of the air inlet 220 and the air intake 260 through a pipeline, and a flow regulating valve is arranged on the pipeline. The flow regulating valve is arranged on the hose 270. The flow regulating valve is configured to control flow through the hose 270 in unit time. In response to there being more dirt on the ground, an opening of the flow regulating valve is enlarged to increase the flow. In response to there being less dirt on the ground, the opening of the flow regulating valve is narrowed to reduce the flow. The flow regulating valve can be a manual valve or an automatic valve. For the automatic valve, the flow regulating valve is connected with the circuit board 300 of the sweeping robot, and the flow of the flow regulating valve is adjusted according to an instruction issued by the circuit board 300.

Figure 13:
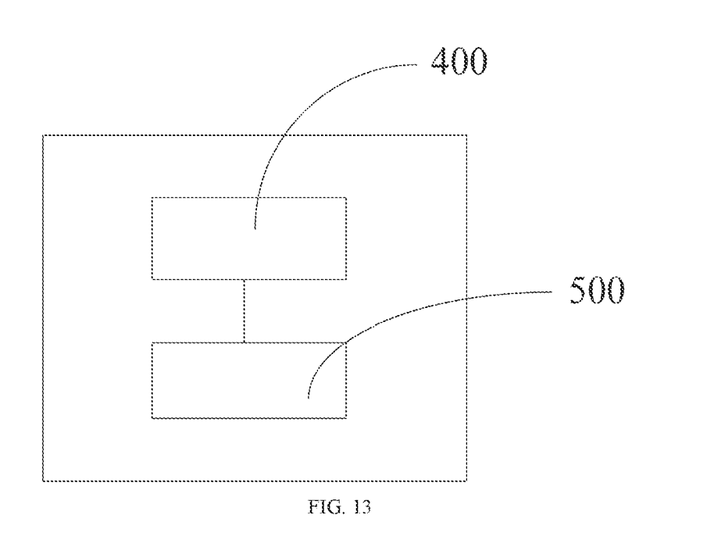
FIG. 13 is a structural schematic view of the sweeping robot provided by another embodiment of the present disclosure.

The second one is that the sweeping robot is provided with a main control circuit 400 and a detection device 500 for dirt, as shown in FIG. 13. The detection device 500 detects the amount of dirt at the current position and sends a detection result to the main control circuit 400. The main control circuit 400 may obtain preset duration corresponding to the detection result according to the detection result, and controls the sweeping robot to stay at the current position for the preset duration. In this embodiment, there are many kinds of detection devices 500, such as infrared sensor, image acquisition device, contact detection sensor, etc. A detection sensor sends a detected signal to the main control circuit 400. The main control circuit 400 compares a received signal with a preset signal intensity-duration table, and finds out jet duration corresponding to the received signal from the table. In response to there being more dirt on the ground, the main control circuit 400 selects corresponding longer jet duration. In response to there being less dirt on the ground, the main control circuit 400 selects corresponding shorter jet duration. In this way, the cleaning efficiency and effect of the sweeping robot can be considered at the same time.

In some embodiments, in order to increase suction efficiency of the brush suction port 110, a bottom of the chassis 100 is also provided with a pressurization bulge 120. The pressurization bulge 120 is arranged in a front side of the brush suction port 110. Pressurization bulges 120 are spaced along the length direction of the brush suction port 110, and the air outlet 230 corresponds to a gap between two adjacent pressurization bulges 120.

In the embodiment, the pressurization bulge 120 is arranged in the front side of the brush suction port 110, and there is an air gap between adjacent pressurization bulges 120, and the air flow flows through the air gap. By setting the pressurization bulge 120, air passing area is reduced, to improve the air pressure entering the brush suction port 110 and be conducive to the suction of dirt by the brush suction port 110. On this basis, the air outlet 230 of the jet channel 210 is arranged corresponding to the gap, so that the air flow in the jet channel can quickly and reliably pass through s gaps and enter the brush suction port 110. In order to make full use of the gap, a length of the air outlet 230 is larger than a width of the corresponding gap. In order to improve the dust suction effect, the air outlet 230 is arranged at the front side of the pressurization bulge 120. By setting the air outlet 230 at the front side of the brush suction port 110, the jet air flows through the bottom of the chassis 100 before pressurization of the pressurization bulge 120, to avoid mutual loss of vertical high-speed air pressure and horizontal high-speed air pressure. A joint position of the pressurization bulge 120 and the air outlet 230 is located in a low-pressure section, which is conducive to improve the utilization rate of the air flow.

In order to ensure a pressurization effect, a height of the pressurization bulge 120 gradually increases along the direction from the front side of the chassis 100 to the brush suction port 110, and a maximum distance between the pressurization bulge 120 and the bottom of the chassis 100 ranges from 0.5 to 5 mm. A distance between the pressurization bulge 120 and the chassis 100 is a height difference between the top of the pressurization bulge 120 and the air outlet 230. In response to the height difference being too small, a distance between the roller brush 810 and the ground is small, resistance between the roller brush 810 and the ground is large, which is not conducive to work. In response to the height difference being too large, the distance between the brush suction port 110 and the ground is too large. Under these circumstances, the roller brush 810 has no pressure and cannot absorb dust, and the dust suction effect is poor.

What is claimed is:

1. A sweeping robot, comprising:
   a chassis, and
   a jet dust raising structure installed on the chassis, wherein the jet dust raising structure has an air inlet, an air outlet, and a jet channel connected to the air inlet and the air outlet, the air inlet is configured for air flow to enter the jet channel, and the air outlet is arranged in a front side of a brush suction port of the sweeping robot;
   wherein the sweeping robot further comprises a dust suction motor, an exhaust port of the dust suction motor is connected with at least one of the air inlet and an air intake of an air inlet chamber of the chassis, and the dust suction motor is connected to the brush suction port brush suction port; and
   wherein the exhaust port is connected to at least one of the air inlet and the air intake through a hose, the sweeping robot comprises a mounting cylinder with a roller brush, a mounting column is arranged on one side of the mounting cylinder away from the roller brush, and a circuit board of the sweeping robot is installed on the mounting column, the hose passes through a limiting gap formed by the circuit board, the mounting column, and the mounting cylinder.

2. The sweeping robot according to claim 1, wherein the air outlet is arranged towards the brush suction port.

3. The sweeping robot according to claim 2, wherein the jet channel extends obliquely in a direction from a top of a front side of the chassis to the brush suction port.

4. The sweeping robot according to claim 3, wherein an angle α between the jet channel and a vertical direction ranges from 20° to 70°.

5. The sweeping robot according to claim 1, wherein the jet channel extends along a straight line, and an inner wall of the jet channel comprises a flat surface.

6. The sweeping robot according to claim 1, wherein the jet channel comprises a drainage section close to the air inlet and a jet section close to the air outlet, the drainage section extends along a straight line, and the jet section extends along a curve line.

7. The sweeping robot according to claim 1, wherein cross-sectional area of the jet channel is gradually reduced from the air inlet to the air outlet.

8. The sweeping robot according to claim 7, wherein a ratio S1/S2 of area S1 of the air outlet to area S2 of the air inlet is greater than or equal to 0.2 and less than 1.

9. The sweeping robot according to claim 1, wherein a length L of the air outlet ranges from 3 mm to 20 mm, or a width D of the air outlet ranges from 0.5 mm to 3 mm.

10. The sweeping robot according to claim 1, wherein a distance K between the air outlet and a center of the brush suction port is greater than 0 and less than or equal to 20 mm.

11. The sweeping robot according to claim 1, wherein the chassis defines an air inlet chamber, the air inlet chamber has an air intake for the air flow, and a plurality of the air inlets are connected to the air inlet chamber.

12. The sweeping robot according to claim 1, wherein a slot is defined on one side of the mounting cylinder away from the roller brush, and part of the hose is clamped in the slot.

13. The sweeping robot according to claim 1, wherein the sweeping robot comprises a main control circuit and a detection device for dirt, the detection device detects an amount of dirt at a current position and sends a detection result to the main control circuit, the main control circuit obtains a preset duration corresponding to the detection result according to the detection result, and controls the sweeping robot to stay at the current position for the preset duration.

14. The sweeping robot according to claim 1, wherein a bottom of the chassis is further provided with a plurality of pressurization bulges, and the plurality of pressurization bulges is arranged in a front side of the brush suction port, the plurality of pressurization bulges is spaced along a length direction of the brush suction port, and the air outlet is corresponding to a gap between two adjacent pressurization bulges.

15. The sweeping robot according to claim 14, wherein the air outlet is arranged at a front side of the pressurization bulge.

16. The sweeping robot according to claim 14, wherein a height of a pressurization bulge gradually increases from a front side of the chassis to the brush suction port, and a maximum distance between the pressurization bulge and a bottom of the chassis ranges from 0.5 mm to 5 mm.

17. The sweeping robot according to claim 1, wherein the jet dust raising structure comprises a jet sheet, the jet sheet is provided with a plurality of the jet channels arranged along a length direction of the brush suction port.

* * * * *